(12) United States Patent
Qin et al.

(10) Patent No.: US 10,985,630 B2
(45) Date of Patent: Apr. 20, 2021

(54) PERMANENT MAGNET DIRECT CURRENT MOTOR AND COOLING FAN MODULE

(71) Applicant: Johnson Electric S.A., Murten (CH)

(72) Inventors: Rui Feng Qin, Hong Kong (CN); Fei Liu, Shen Zhen (CN)

(73) Assignee: Johnson Electric International AG, Murten (CH)

(*) Notice: Subject to any disclaimer, the term of this patent is extended or adjusted under 35 U.S.C. 154(b) by 646 days.

(21) Appl. No.: 15/475,883

(22) Filed: Mar. 31, 2017

(65) Prior Publication Data
US 2017/0288498 A1 Oct. 5, 2017

(30) Foreign Application Priority Data

Apr. 1, 2016 (CN) .................. 2016 1020 1540.5

(51) Int. Cl.
H02K 23/26 (2006.01)
H02K 1/17 (2006.01)
H02K 13/14 (2006.01)
F04D 25/06 (2006.01)
H02K 7/14 (2006.01)
H02K 1/24 (2006.01)

(52) U.S. Cl.
CPC .............. H02K 7/14 (2013.01); F04D 25/06 (2013.01); F04D 25/0693 (2013.01); H02K 1/24 (2013.01); H02K 13/14 (2013.01); H02K 23/26 (2013.01); H02K 1/17 (2013.01); H02K 2213/03 (2013.01)

(58) Field of Classification Search
CPC .. H02K 1/17; H02K 7/14; H02K 1/24; H02K 13/14; H02K 23/26; H02K 2213/03; F04D 25/06; F04D 25/0693
See application file for complete search history.

(56) References Cited

U.S. PATENT DOCUMENTS

2009/0121574 A1* 5/2009 Aoyama ................. H02K 23/26
310/195
2014/0062266 A1* 3/2014 Qin ........................ H01H 85/08
310/68 B
2014/0210299 A1* 7/2014 Qin .......................... H02K 3/28
310/203

* cited by examiner

Primary Examiner — Quyen P Leung
Assistant Examiner — Alexander Moraza
(74) Attorney, Agent, or Firm — Muncy, Geissler, Olds & Lowe, P.C.

(57) ABSTRACT

A cooling fan module includes a fan and a PMDC motor. The PMDC motor includes a stator and a rotor. The stator has 2P magnetic poles. The rotor includes a rotary shaft, a rotary core, a commutator, and a winding. The rotor core includes m×P pole teeth. The commutator includes k×m×P commutator segments. Adjacent pole teeth define therebetween winding slots for receiving the winding. The winding includes winding units each having P coils. Each of two ends of each winding unit includes a lead-out line connected to the commutator segment. Any two lead-out lines extending out of different winding slots are spaced from each other at locations outside the commutator segments.

18 Claims, 12 Drawing Sheets

| segment | tooth | coil | tooth | coil | tooth | coil | segment | winding direction | winding unit |
|---|---|---|---|---|---|---|---|---|---|
| K1(start) | T1 | C1 | T7 | C7 | T4 | C4 | K8 | CW | WA |
| K8 | T3 | C3' | T6 | C6' | T9 | C9' | K15 | CCW | WB' |
| K15 | T8 | C8 | T5 | C5 | T2 | C2 | K4 | CW | WC |
| K4 | T1 | C1' | T4 | C4' | T7 | C7' | K11 | CCW | WA' |
| K11 | T6 | C6 | T3 | C3 | T9 | C9 | K18 | CW | WB |
| K18 | T8 | C8' | T2 | C2' | T5 | C5' | K7(end) | CCW | WC' |

FIG. 5

PERMANENT MAGNET DIRECT CURRENT MOTOR AND COOLING FAN MODULE

CROSS REFERENCE TO RELATED APPLICATIONS

This non-provisional patent application claims priority under 35 U.S.C. § 119(a) from Patent Application No. 201610201540.5 filed in The People's Republic of China on Apr. 1, 2016.

FIELD OF THE INVENTION

This invention relates to direct current motors, and in particular to a permanent magnet direct current motor and a cooling fan module having the permanent magnet direct current motor.

BACKGROUND OF THE INVENTION

Permanent magnet direct current (PMDC) motors have been widely used in many applications. In one application, the PMDC motor is used as a fan motor for cooling a vehicle engine. Because of safety requirements in vehicle, the fan motor is required having stricter safety and reliability than in other applications.

The PMDC motor typically includes a wound-rotor with a commutator. This type of rotor includes a plurality of pole teeth on which an armature winding is wound. The winding surrounds the pole teeth to form coil units. The coil units have lead-out lines connected to segments of the commutator. If the lead-out lines of the coil units that are connected to the commutator segments intersect each other, short-circuit may easily occur, which may cause motor malfunction.

SUMMARY OF THE INVENTION

Thus there is a desire for a PMDC motor with stable performance and a cooling fan module using the PMDC motor.

One embodiment of the present invention provide a permanent magnet direct current motor, comprising: a stator having 2P magnetic poles, where P is an integer greater than one; and a rotor rotatably mounted to the stator, the rotor comprising a rotary shaft, a rotary core fixed to the rotary shaft, a commutator, and a winding, the rotor core comprising m×P pole teeth, where m is an odd number greater than one, the commutator comprising k×m×P commutator segments, k being equal to 1 or 2; wherein the winding comprises a plurality of winding units each having P coils directly connected in series, the P coils are respectively wound around P pole teeth having the same phase, two ends of each winding unit are directly connected to the commutator segments of the commutator, and ends of the lead-out lines at the two ends of all winding units that are close to the commutator segments do not intersect each other.

Preferably, the winding is wound by a continuous wire.

Preferably, the lead-out line of one of the winding units of the winding extends out from the last one of the winding units and is connected one corresponding commutator segment or another commutator segment having the same potential as the corresponding commutator segment after extending across one or two adjacent pole teeth, in such a manner that a wire terminal of the winding unit is spaced apart from ends of the lead-out lines of other winding units located close to the commutator segment.

Preferably, the winding comprises n layers, where n is an integer greater than zero but less than P, each layer comprises k×m winding units, each commutator segment of a part of the k×m×P commutator segments is connected to 2n winding units at the same time, each commutator segment of another part of the k×m×P commutator segments is connected to n winding units at the same time, and the remaining commutator segments of the k×m×P commutator segments are connected to none of the winding units.

Preferably, in the 2n winding units connected to one shared commutator segment, n winding units are wound in a clockwise direction, and the other n winding units are wound in a counter-clockwise direction.

Preferably, k is equal to two, n is equal to one, and each pole tooth is wound with two coils that belong to two winding units, respectively. Alternatively, k is equal to two, n is equal to one, and each pole tooth is wound with four coils that belong to four winding units, respectively.

Preferably, the rotor further comprises equalizing wires for connecting commutator segments having the same potential.

Preferably, the direct current motor further comprises a positive brush and a negative brush for being electrically connected with the commutator segments of the commutator; the k×m winding units of each layer of the winding form two parallel branches electrically connected with the positive brush and the negative brush.

Preferably, P is equal to three, m is equal to three, and the direct current motor is a six-pole nine-slot motor. Alternatively, P is equal to four, m is equal to three, and the direct current motor is an eight-pole twelve-slot motor. Alternatively, P is equal to two, m is equal to three, and the direct current motor is a four-pole six-slot motor One embodiment of the present invention further provides a cooling fan module. The cooling fan module includes a fan and any permanent magnet direct current motor described above.

In comparison with the prior art, the above embodiments of the present invention have the following advantages: the lead-out lines of the winding units that are connected to the commutator segments do not intersect each other, which can effectively avoid short-circuit of the winding units and ensure normal operation of the motor.

BRIEF DESCRIPTION OF THE DRAWINGS

FIG. 5 illustrates the connection between the winding and the pole teeth and commutator segments.

DETAILED DESCRIPTION OF THE PREFERRED EMBODIMENTS

Embodiments and advantages of the present invention will be described as follows with reference to the accompanying drawings. It should be noted that the figures are merely illustrative rather than restrictive. It also should be noted that the figures are only intended to facilitate the description and are not drawn to scale.

Figure 1:
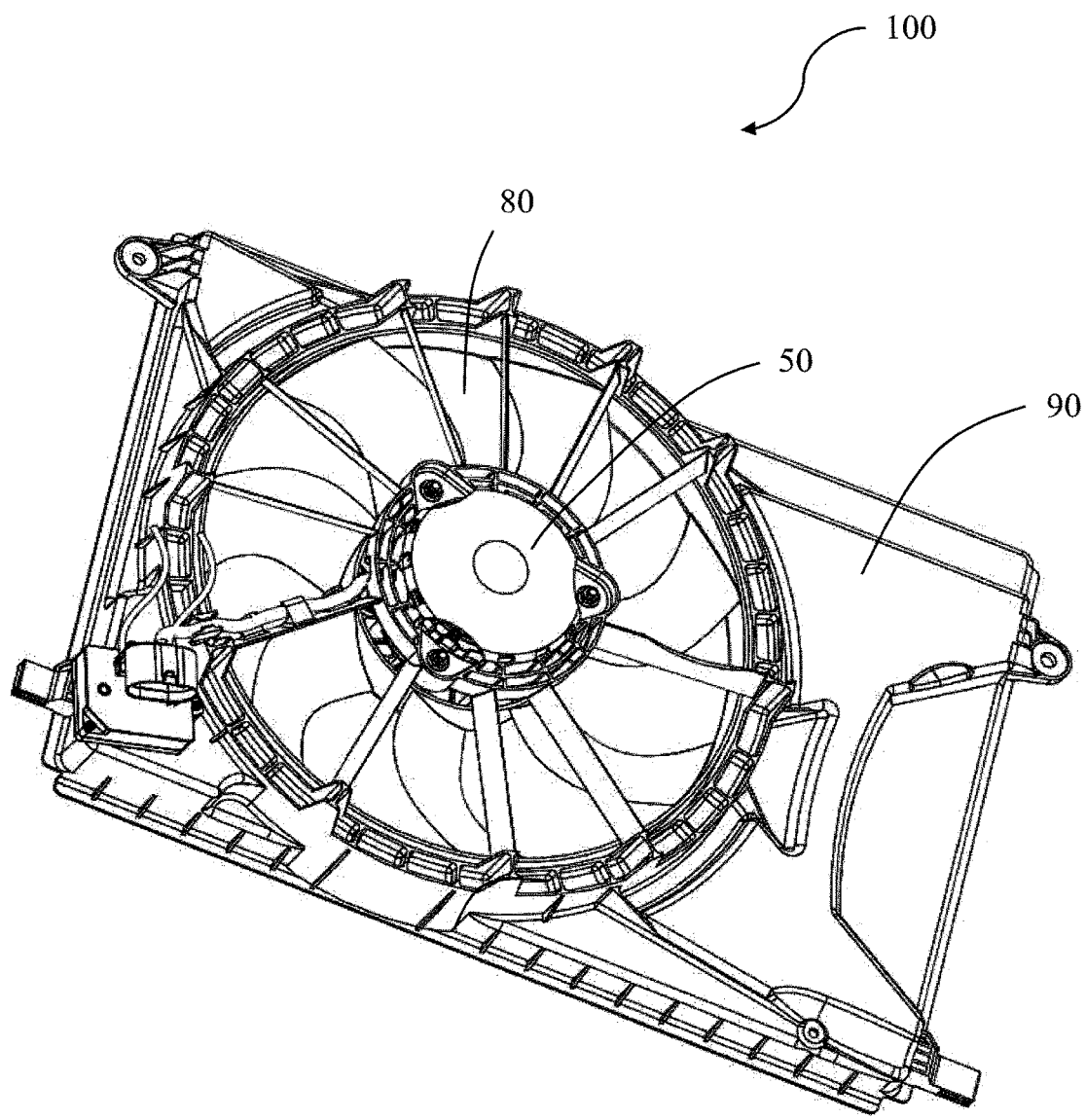
FIG. 1 illustrates a cooling fan module according to an embodiment of the present invention.

Referring to FIG. 1, the cooling fan module 100 of the present invention includes a fan 80, and a housing 90 for being fittingly mounted to a heat sink or another mounting part. The housing 90 supports a permanent magnet direct current (PMDC) motor 50 which drives the fan 80 to generate cooling airflow.

Figure 2:
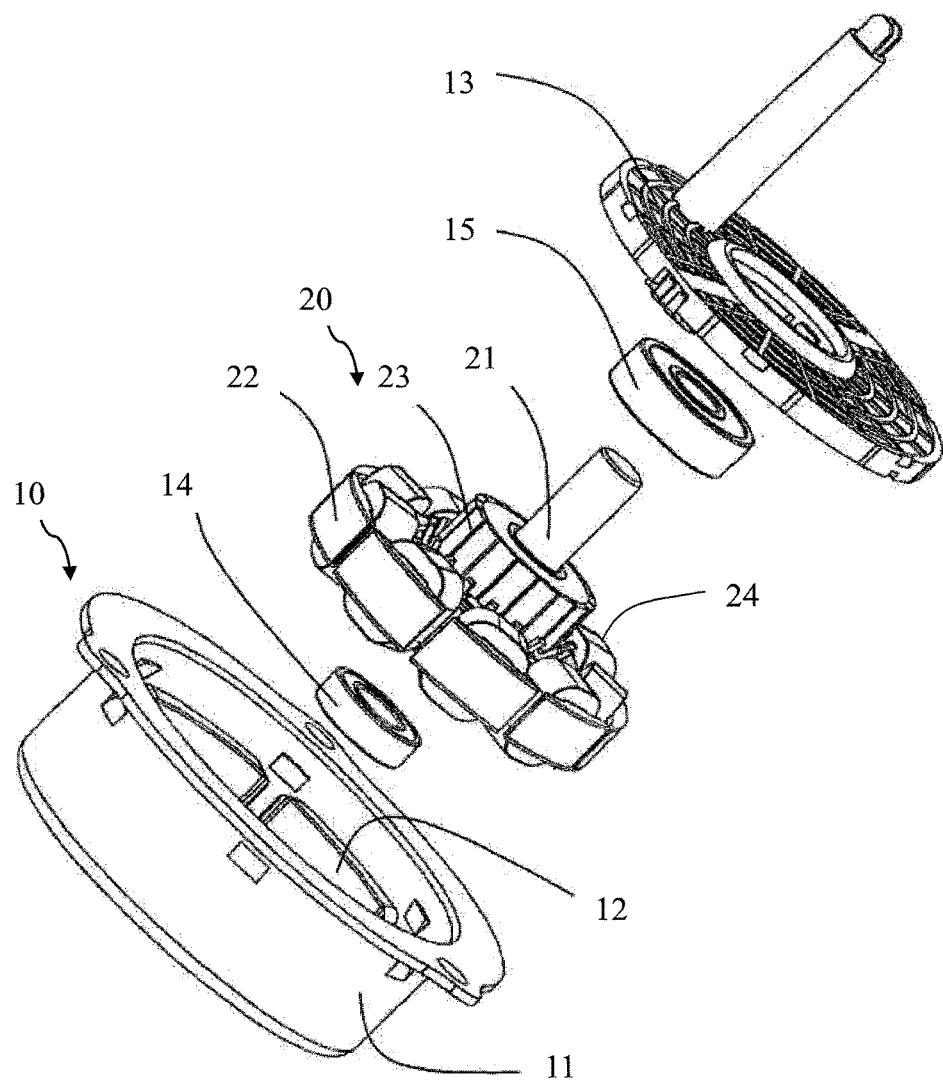
FIG. 2 is an exploded view of a PMDC motor of the cooling fan module of FIG. 1.

Referring to FIG. 2, the PMDC motor 50 includes a stator 10 and a rotor 20.

The stator 10 includes an outer casing 11 with an open end, a permanent magnet 12 mounted to an inner wall surface of the outer casing 11, an end cap 13 attachable to the open end, a bearing 14 mounted in the outer casing 11, and a bearing 15 mounted in the end cap 13. If P is used to represents the number of pole-pairs of magnetic poles of the PMDC motor 50, the permanent magnet 12 forms six magnetic poles and therefore P is three in this embodiment.

Figure 3:
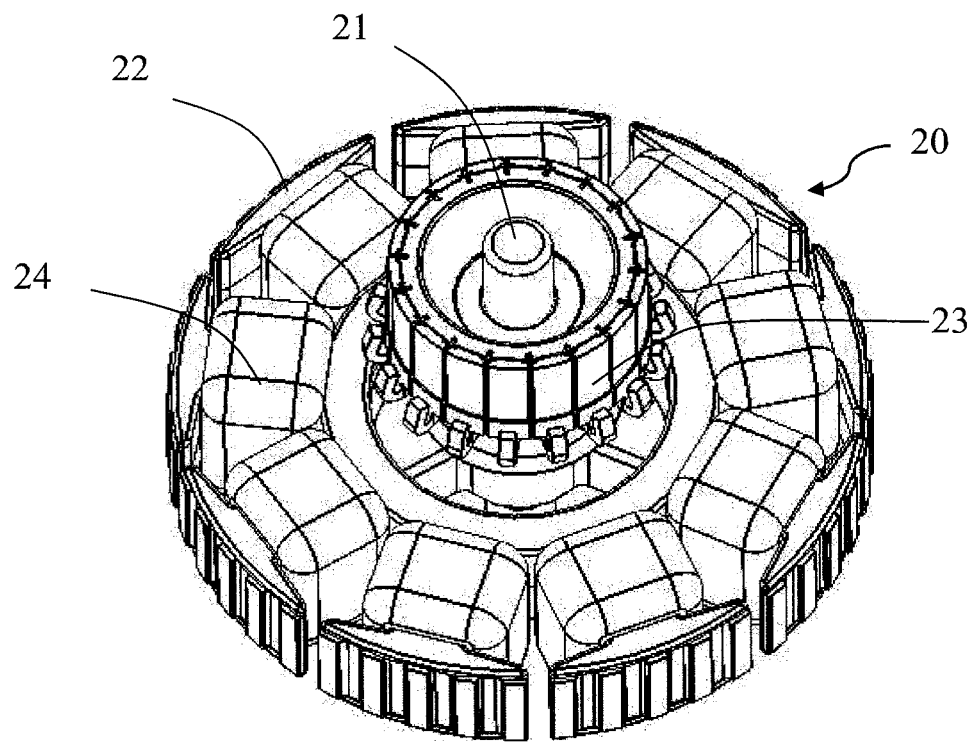
FIG. 3 illustrates a rotor of the PMDC motor of FIG. 2.

Referring also to FIG. 3, the rotor 20 includes a rotary shaft 21, a rotor core 22, a commutator 23 fixed to the rotary shaft 21, and a winding 24 wound around the rotor core 22. Two ends of the rotary shaft 21 are supported by two bearings 14, 15, respectively such that the rotor 20 is capable of rotation relative to the stator 10.

The rotor core 22 includes a plurality of pole teeth, each two adjacent pole teeth defining a winding slot therebetween, for receiving coils of the winding 24. The number of the pole teeth of the rotor 20 is an odd-number times of the number of the pole-pairs. If the number of the pole-pairs of the rotor 20 is represented by m×P, m is an odd number greater than one. In this embodiment, P is three, m is also three, and the number of the pole-pairs of the rotor 20 is nine.

The commutator 23 includes a plurality of commutator segments. In this embodiment, the number of the commutator segments is two times of the number of the pole teeth, i.e. eighteen. If the number of the commutator segments is represented by k×(m×P), k is equal to two. In another embodiment, the number of the commutator segments may be equal to the number of the pole teeth, i.e. k is equal to one.

The winding 24 includes a plurality of coils each wound around a corresponding one of the pole teeth. In this embodiment, the number of the coils is eight, and each of the pole teeth is wound with two coils.

Figure 4:
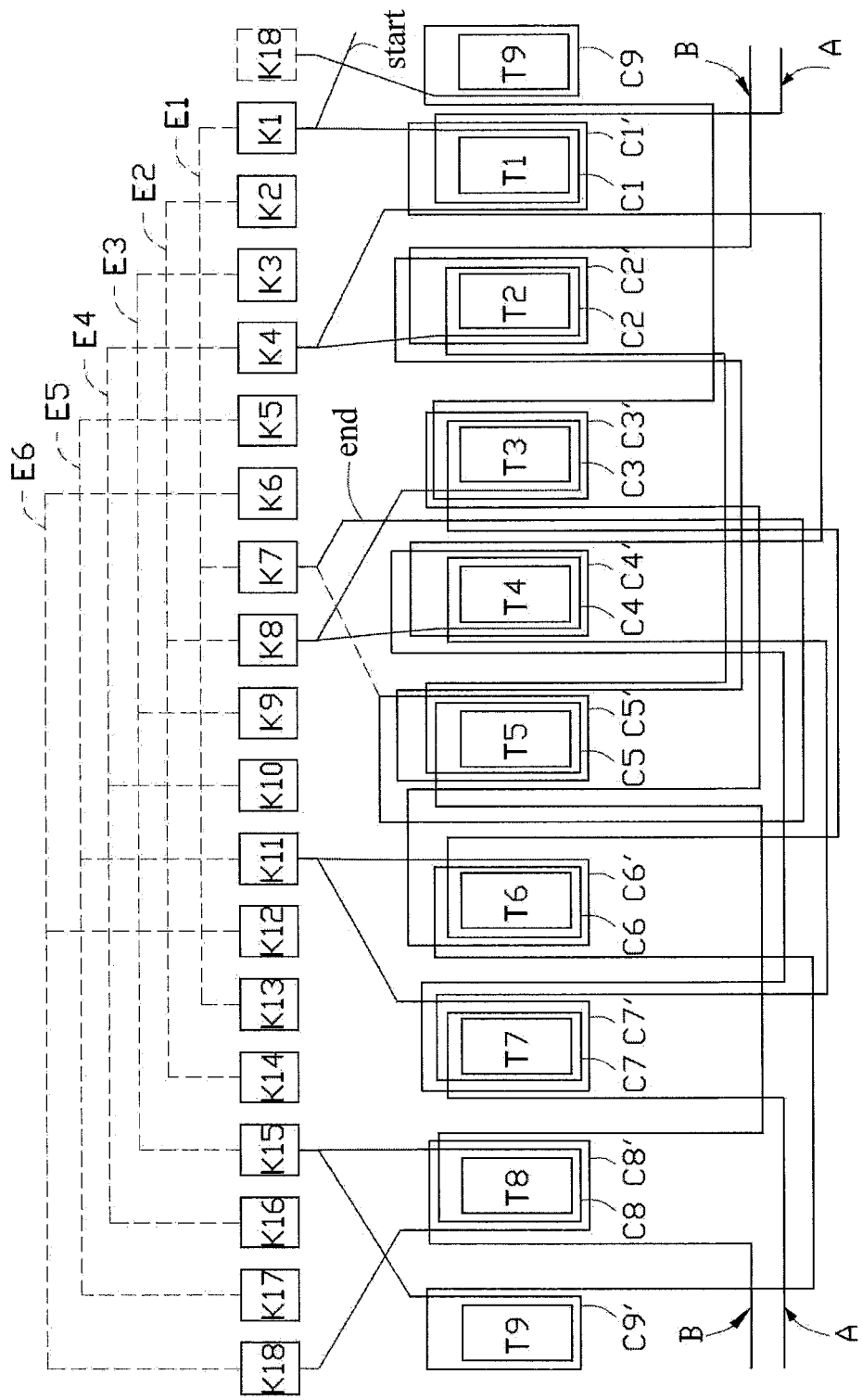
FIG. 4 is a development view of the rotor of FIG. 3.

Referring to FIG. 4, equalizing wires, the commutator segments and the pole teeth of the rotor 20 are linearly presented by development view. The segments of the commutator 22 are represented by K1-K18. Each three of the commutator segments correspond to the magnetic poles of the stator 10 with the same polarity, such as S poles, i.e. having the same potential. The each three of the commutator segments are electrically connected through corresponding equalizing wires E1-E6. The commutator segments K1, K7 and K13 are electrically connected by the equalizing wire E1, the commutator segments K2, K8 and K14 are electrically connected by the equalizing wire E2, and likewise, the other commutator segments with same potential are equipotential by corresponding equalizing wires.

The nine pole teeth of the rotor core 23 are represented by T1-T9, and the eighteen coils of the winding 24 are represented by C1-C9 and C1'-C9'. The coils C1-C9 are all wound in the clockwise direction, while the coils C1'-C9' are all wound in the counter-clockwise direction. Each pole tooth Tn is wound with two coils Cn and Cn', where n is one of the numbers from 1 to 9.

The pole teeth T1-T9 of the rotor core 23 may be divided into three groups according to their phase, each group including three pole teeth with the same phase. An angular distance between the pole teeth in the same group is equal to an angular distance between the stator poles with the same polarity. When the rotor 20 rotates relative to the stator 10, the pole teeth of each group are aligned with the magnetic poles with the same polarity, such as S poles, at the same time. For example, when the pole tooth T1 is aligned with one S pole of the stator 20, the pole teeth T4 and T7 having the same phase as the pole tooth T1 are aligned with the other two S poles of the stator 20.

Referring also to FIG. 5, the winding process of the winding 24 is further described below. In this embodiment, a wire has a starting terminal connected to the commutator segment K1. The wire is then sequentially wound around the pole teeth T1, T7 and T4 of a first group with the same phase in a clockwise (CW) direction, and is then connected to the commutator segment K8 to form a winding unit WA. Specifically, the wire starts from the commutator segment K1. After wound several turns around the pole tooth T1 in the clockwise direction to form the coil C1, the wire extends directly to the pole tooth T7 where the wire is wound several turns around the pole tooth T7 along the clockwise direction to form the coil C7, the wire then extends directly to the pole tooth T4 where the wire is wound several turns around the pole tooth T4 to form the coil C4, and finally the wire is connected to the commutator segment K8. In this case, the coils C1, C7 and C4 are connected directly in series. In this description and the claims, the coils that are connected directly in series are referred to as a winding unit which connects to the corresponding commutator segments at only its two terminals. That is, the winding unit connects directly to only two commutator segments, and any two adjacent coils are connected directly between each other but not connected to any commutator segment. Specifically, with respect to the winding unit WA, it connects to the commutator segments K1 and K8 at its two terminals, where the commutator segment K8 has the same phase as the commutator segment K2 that is adjacent to the starting segment K1, and among all the segments that have the same phase as the K2, the commutator segment K8 is the one closest to the pole tooth T4.

After connected to the commutator segment K8, the wire is sequentially wound around the teeth T3, T6, T9 of a second group with the same phase in a counter-clockwise (CCW) direction to sequentially form the coil C3', C6', C9', and is then connected to the commutator segment K15 to form a winding unit WB', where the commutator segment K15 has the same phase as the commutator segment K9 and is closer to the pole tooth T9 than the commutator segment K9. Afterwards, the wire is sequentially wound around the teeth T8, T5, T2 of a third group with the same phase in the clockwise direction to sequentially form the coils C8, C5, C2, and is then connected to the commutator segment K4 to form a winding unit WC, where the commutator segment K4 has the same phase as the commutator segment K16 and is closer to the pole tooth T2 than the commutator segment K16. The wire is then sequentially wound around the teeth T1, T4, T7 of the first group with the same phase in the counter-clockwise direction to sequentially form the coils C1', C4', C7', and is then connected to the commutator segment K11 to form a winding unit WA', where the commutator segment K11 has the same phase as the commutator segment K5 and is closer to the pole tooth T7 than the commutator segment K5. The wire is then sequentially wound around the teeth T6, T3, T9 of the second group with the same phase in the clockwise direction to sequentially form the coil C6, C3, C9, and is then connected to the commutator segment K18 to form a winding unit WB, where the commutator segment K18 has the same phase as the commutator segment K12 and is closer to the pole tooth T7 than the commutator segment K12. The wire is sequentially wound around the teeth T8, T2, T5 of the third group with the same phase in the counter-clockwise direction to sequentially form the coils C8', C2', C5'.

Figure 6:
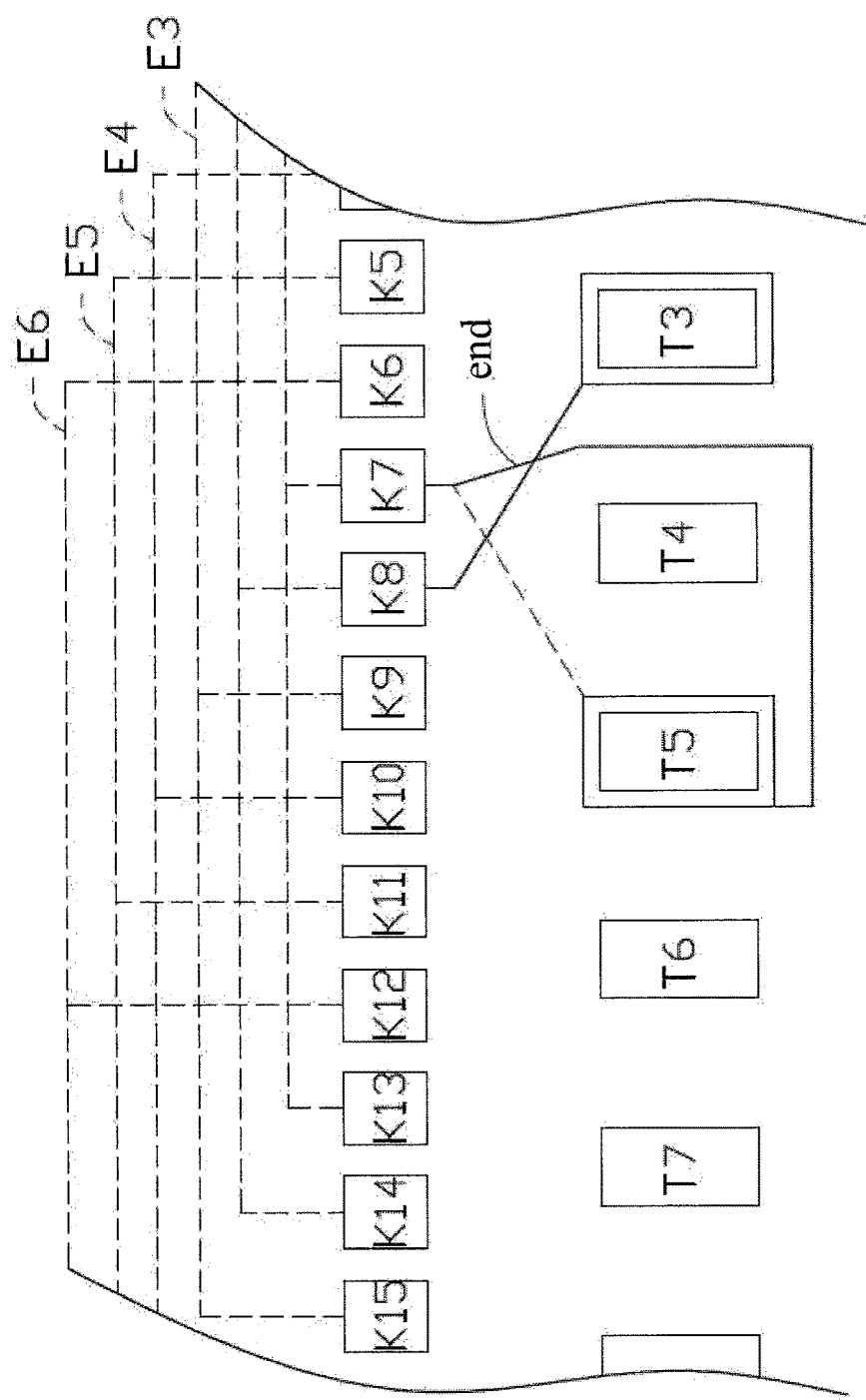
FIG. 6 illustrates a portion of winding scheme of the rotor of FIG. 4.

Referring also to FIG. 6, however, if, after wound around the pole tooth T5, the wire terminal is directly connected to the commutator segment K7, i.e. connected to the commutator segment that is closest to the pole tooth T5 among all the commutator segments having the same phase as the commutator segment K1 adjacent to the commutator segment K18, as indicated by the broken line connected between the pole tooth T5 and the commutator segment K7 shown in FIG. 6, the wire terminal will intersect a lead-out line of the coil C3' connected to the commutator segment K8, which can easily cause short-circuit of the motor during operation. Therefore, the wire is wound in a different manner in this invention such that, after wound around the pole tooth T5 to form the coil C5', the wire terminal extends across the pole tooth T4 from a bottom side of the pole tooth T4, through the winding slot between the pole teeth T4 and T3, and is then connected to the commutator segment K7, thereby preventing the wire terminal from intersecting another lead-out line at locations close to the commutator. The lead-out lines connected to the commutator segments K7 and K8 as shown appear to intersect. However, the two lead-out lines lead out from the same winding slot between the pole teeth T3 and T4 and, therefore, during the winding process, the two lead-out lines intersect in the winding slot or at a location close to the winding slot but do not intersect at locations close to the commutator. Therefore, in this invention, the lead-out lines extending out of different winding slots do not intersect each other. In addition, the "do-not-intersect" situation as described in this invention does not apply to the lead-out lines connected to the same commutator segment.

As can be seen from the above winding process, each tooth is wound with two coils that belong to two different winding units, respectively. Two ends of the two winding units are connected to different commutator segments. For example, the pole tooth T1 is wound with two coils C1 and C1', the coils C1 and C1' belong to different winding units WA and WA', respectively, and the different winding units are connected to different commutator segments.

In this invention, each winding unit is directly connected to two commutator segments. In these two commutator segments, one commutator segment has the same potential as another commutator segment adjacent to the other commutator segment. For example, the winding unit WA is connected to the commutator segments K1 and K8, the commutator segments K8 and K2 have the same potential, and the commutator segment K2 is adjacent the commutator segment K1. Similarly, K1 and K7 have the same potential, and K7 is adjacent to K8. The circuit is equivalent when the coil is connected to a commutator segment having the same potential. That is, the two terminals of the winding unit WA can be connected to the adjacent commutator segments K1 and K2. Alternatively, one of the two terminals can be connected to the commutator segment K1, and the other terminal is connected to a commutator segment that has the same potential as the commutator segment K2, such as the commutator segment K8 or K14. Alternatively, the two terminals can be connected to the commutator segments K7 and K8, or connected to the commutator segments K13 and K14. All in all, the two terminals of the winding unit can be connected to a pair of adjacent commutator segments, and any of the two adjacent commutator segments can be replaced by another commutator segment that has the same potential. It is preferred to minimize the distance that the wire extends to connect to the commutator segment. For example, after the wire of the winding unit is wound to form the coil C4, the wire is connected to the closest commutator segment K8 of the group of commutator segments K2, K8 and K14 having the same potential, rather than connected to the farther commutator segments K2 and K214, to further reduce winding time and material cost of the wire.

It should be understood that the coils of one winding unit are wound around the pole teeth having the same phase and, therefore, these coils have also the same phase, i.e. they are aligned with the magnetic poles of the stator having the same polarity at the same time. The coils within the same winding unit can be wound in a different sequence than illustrated in the embodiment above. For example, the pole teeth T1, T7 and T4 have the same phase, and the corresponding coils C1, C7 and C4 have also the same phase. Therefore, the winding sequence of the coils C1, C7 and C4 can be adjusted depending on actual requirements. For example, the coil C1 may be first wound, followed by the winding of the coils C4 and C7.

Figure 7:
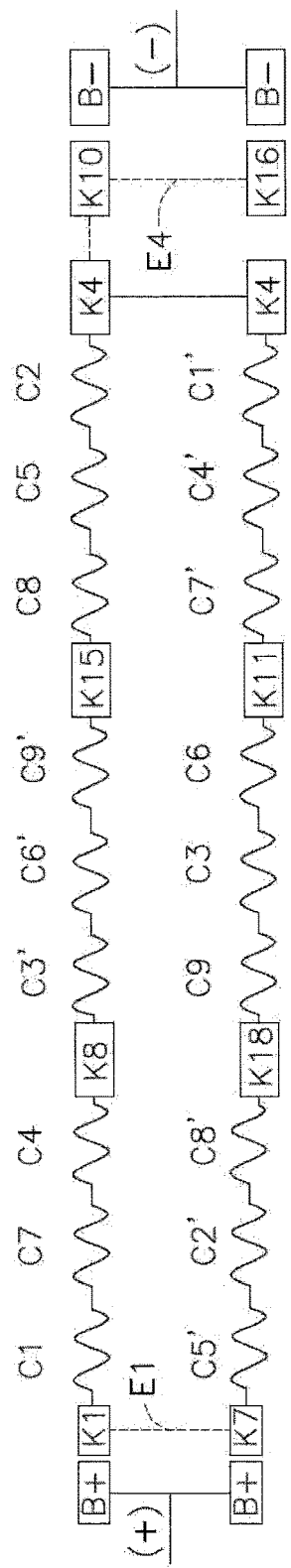
FIG. 7 illustrates circuit connection between the winding and commutator segments of FIG. 4 and the stator brushes.

Referring also to FIG. 7, the DC motor of this embodiment includes two pair of brushes. Each pair of brushes includes a positive brush B+ and a negative brush B−, and the eighteen coils of the DC motor form a total of two parallel branches each connected between the positive brush B+ and the negative brush B−, with each branch including nine coils.

The rotor of the DC motor of this embodiment forms a total of six winding units each including three coils directly connected in series. In the following, the rule of the number of the winding units and the coils of the rotor of the DC motor of the present invention is described in detail.

In this embodiment, all the winding units are different from each other, either in the pole teeth on which the winding units are wound, or in the winding direction. This type of winding is referred to as a single-layer winding. It should be understood that, if a winding of the rotor includes at least one pair of winding units, each pair of winding units includes two parallel winding units that are identical both in the pole teeth on which the winding units are wound and in the winding direction, this type of winding is referred to as a double-layer winding. It is noted that, since the number of the coils of each winding unit is equal to the number of the pole teeth of one group having the same phase, if the rotor winding is a single-layer winding, then the number of the winding units of the rotor may be represented by k×m. It can thus be deduced that, if the rotor winding is a n-layer winding, then the number of the winding units of the rotor may be represented by n×k×m.

Figure 8:
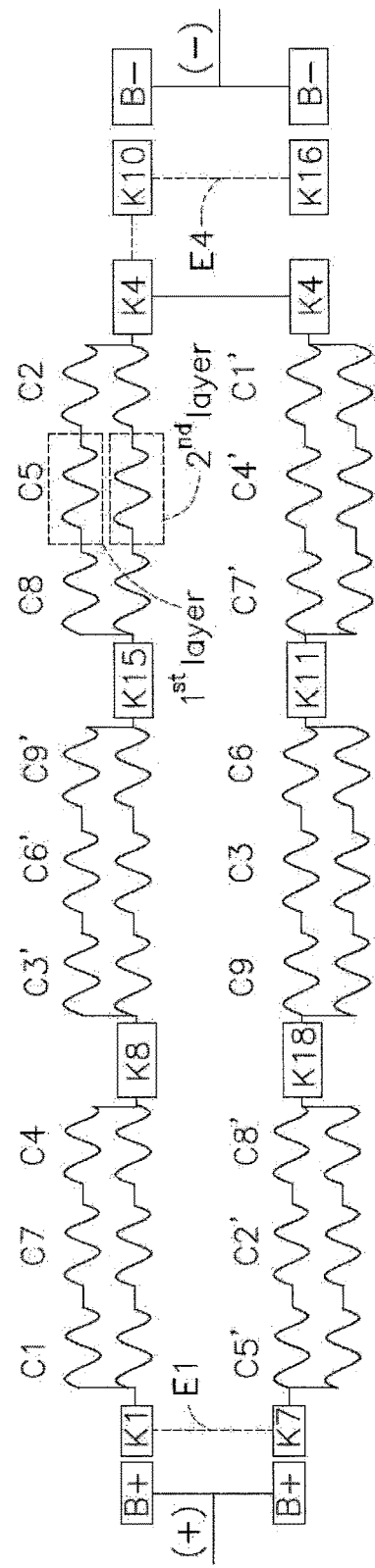
FIG. 8 illustrates circuit connection between the winding, commutator segments and stator brushes according to another embodiment.

FIG. 8 is a diagram showing the circuit connection of the brushes, rotor winding and commutator segments of a DC motor according to another embodiment of the present invention. The DC motor is also a six-pole nine-slot DC motor having eighteen commutator segments, i.e. the pole number 2P is six, and the tooth number m×P is nine, i.e. m is equal to three; the number of the commutator segments is two times of the tooth number, i.e. k is equal to two. The embodiment of FIG. 8 differs from the embodiment of FIG. 7 mainly in that, the winding of the DC motor of FIG. 8 is a double-layer winding, i.e. n is equal to two, and the number of the winding units and the number of the coils are two times of those of the DC motor of FIG. 3, respectively.

Specifically, the DC motor of FIG. 7 includes six (n×k×m=1×2×3=6) winding units each having three (P) coils directly connected in series, and the DC motor of FIG. 8 includes twelve (n×k×m=2×2×3=12) winding units each having the same three coils. The twelve winding units form a total of six pairs of winding units, each pair including two parallel winding units. In this embodiment, the two winding units are identical in the pole teeth on which the winding units are wound, in the winding direction, and in the commutator segments to which the winding units are connected.

In the embodiment illustrated in FIG. 8, the total number of the coils is four times of the tooth number. Therefore, each tooth is wound with four coils that belong to four winding units, respectively. In the four winding units, two winding units are connected in parallel and each have two ends connected to the same pair of commutator segments, i.e. the two winding units belong to the same pair of winding units, while the other winding units are connected in parallel and each have two ends connected to another pair of commutator segments, i.e. the other two winding units belong to another same pair of winding units. For example, the tooth T5 is wound with two coils C5 and two coils C5'. The two coils C5 are wound in an inner layer and an outer layer (or a first layer and a second layer), respectively, and belong to two winding units having two ends connected to the same pair of commutator segments K15 and K4. The other two coils C5' are wound in the inner layer and the outer layer (or the first layer and the second layer) and belong to two winding units having two ends connected to another pair of commutator segments K7 and K18.

Figure 9:
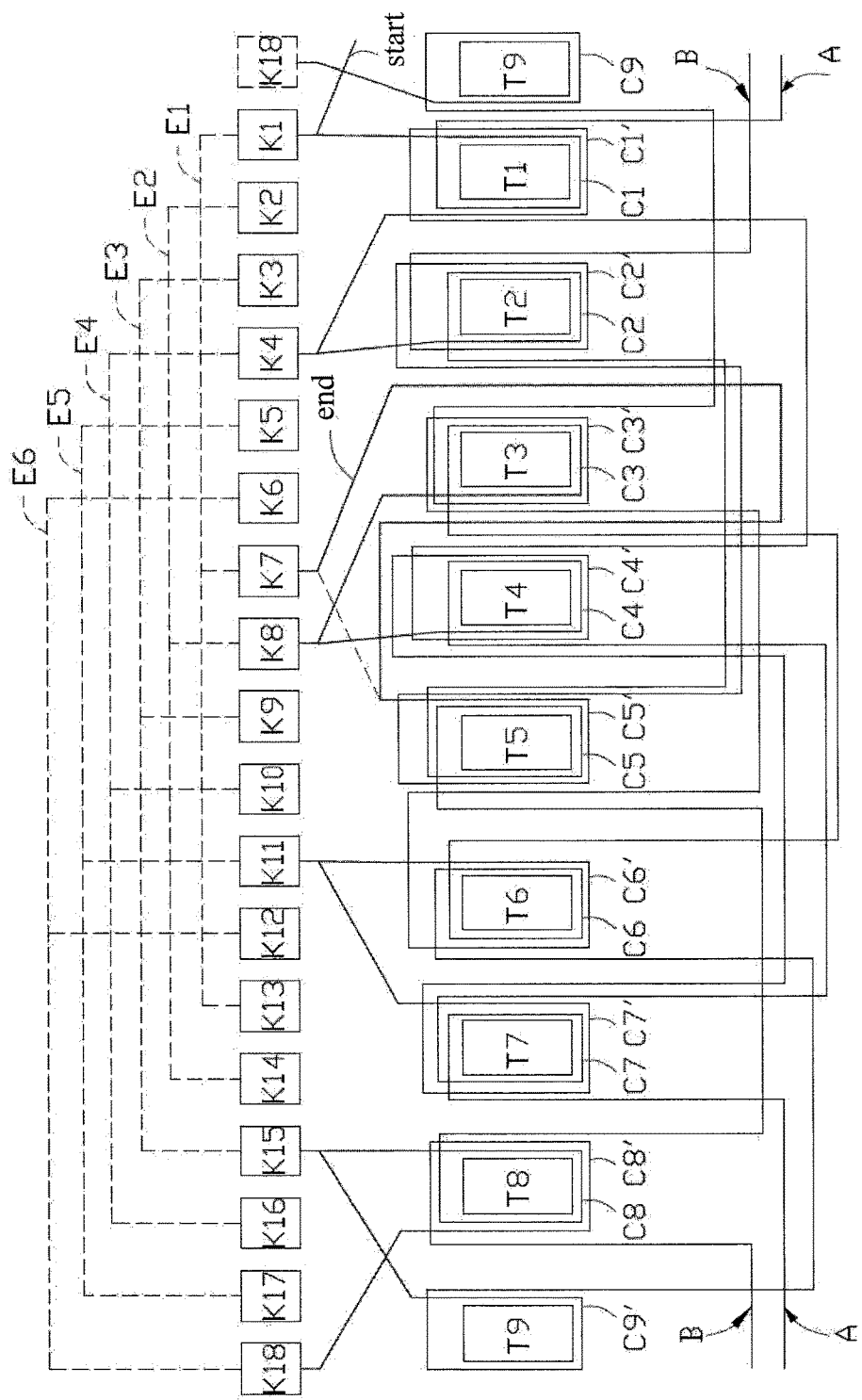
FIG. 9 illustrates an alternative winding manners of the rotor of FIG. 3.
Figure 10:
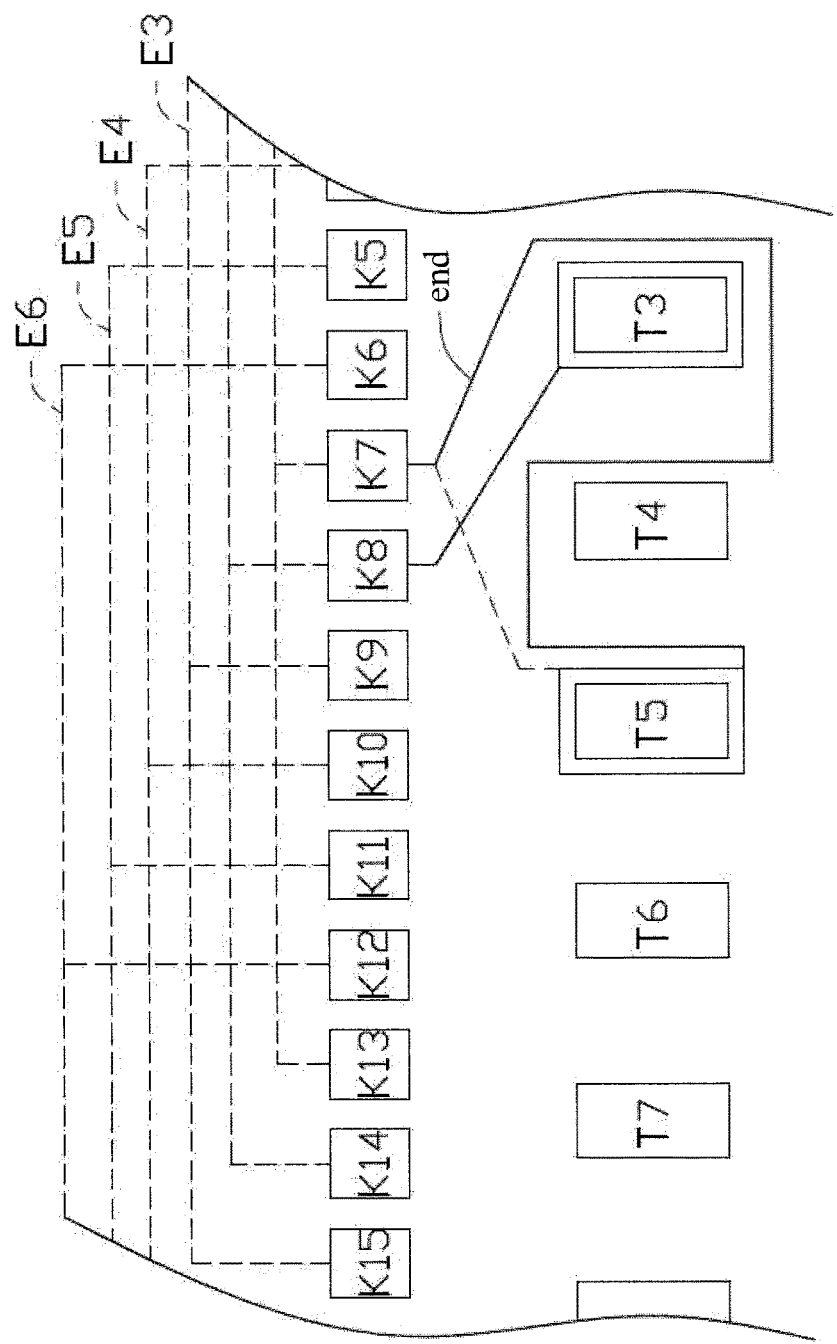
FIG. 10 illustrates a portion of winding scheme of the rotor of FIG. 9.
Figure 11:
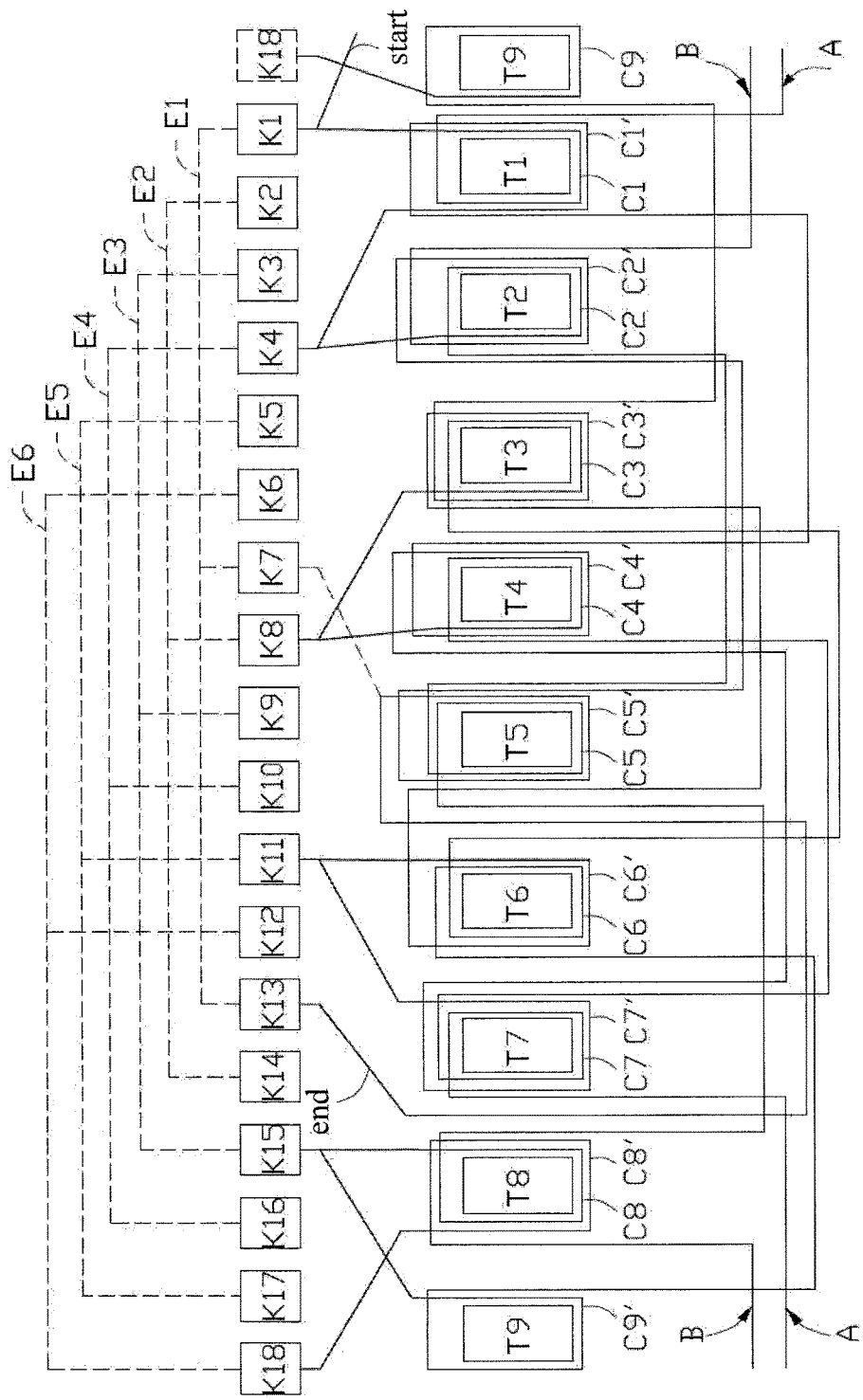
FIG. 11 illustrates an alternative winding manners of the rotor of FIG. 3.
Figure 12:
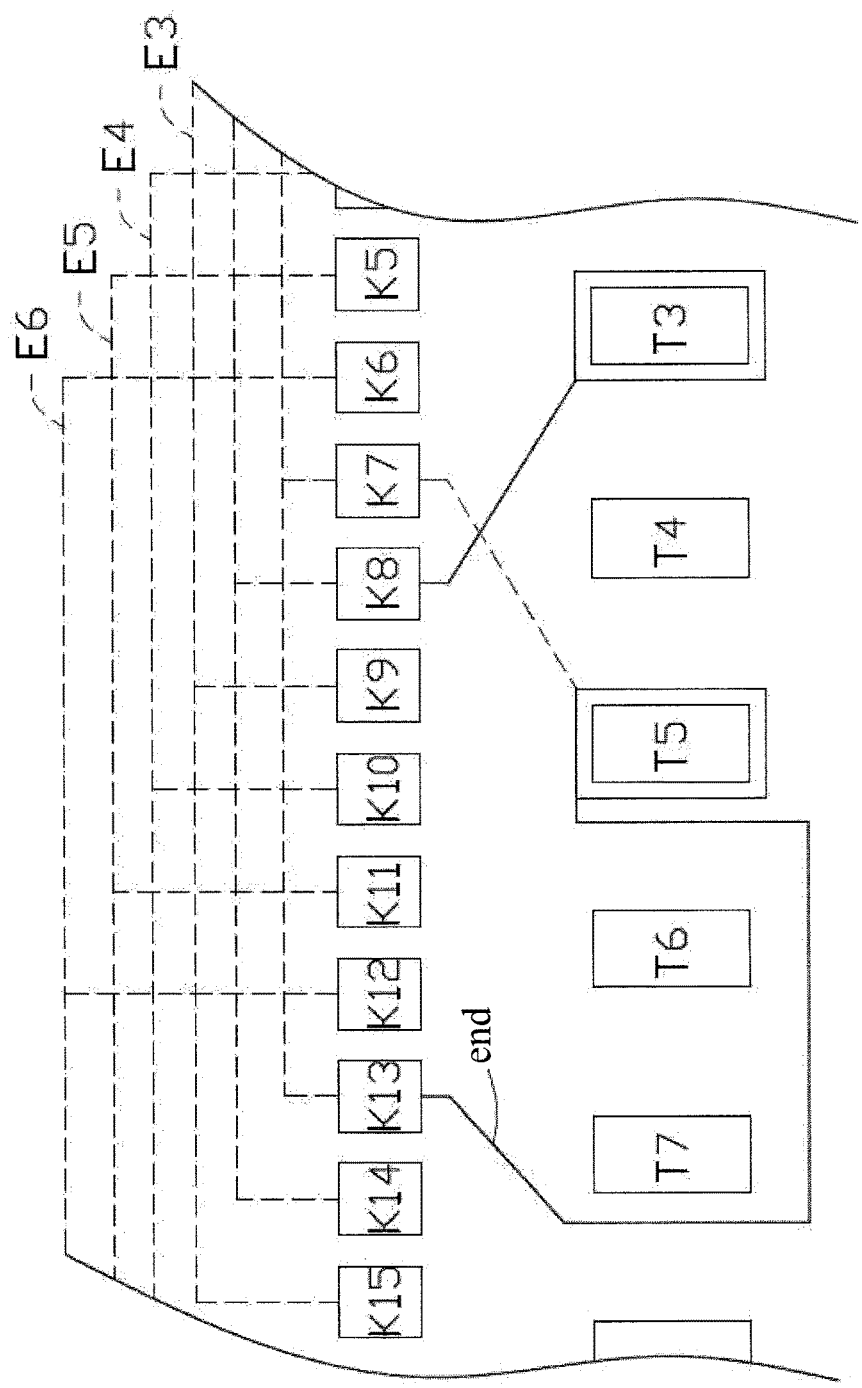
FIG. 12 illustrates a portion of winding scheme of the rotor of FIG. 11.

Referring also to FIG. 9 to FIG. 12, it should be understood that, the extending path of the wire terminal may be modified as long as the wire terminal and the lead-out lines of the two ends of all winding units do not intersect. Specifically, after wound around the pole tooth T5 in the counter-clockwise direction to form the coil C5', the wire terminal sequentially extends across the pole tooth T4 from a top side of the pole tooth T4 and then across the pole tooth T3 from a bottom side of the pole tooth T3, and is then connected to and terminates at the commutator segment K7; the wire terminal and each of the lead-out lines of other winding units do not intersect (FIG. 9 and FIG. 10). Alternatively, after wound around the pole tooth T5 in the counter-clockwise direction to form the coil C5', the wire terminal extends across the pole teeth T6, T7 from a bottom side of the pole teeth T6, T7, and is then connected to and terminates at the commutator segment K13 having the same potential as the commutator segment K1; the wire terminal and each of the lead-out lines of other winding units do not intersect (FIG. 11 and FIG. 12).

It should be understood that, in other embodiments, the number of the magnetic poles, pole teeth and commutator segments may vary, and the number of the series-connected coils of the winding unit may vary accordingly. For example, the number of the magnetic poles is set to be eight or four, the number of the pole teeth is set to be twelve or six, and the number of the commutator segments is set to be twenty-four or twelve, i.e. the DC motor is an eight-tooth twelve-slot DC motor or a four-tooth six-slot DC motor.

It should be understood that, in other embodiments, the winding manner of the winding 24 may vary. For example, the winding may be discontinuous, and the two ends of all winding units are connected to different commutator segments, respectively.

In the DC motor of the cooling fan module, each winding unit includes P coils directly connected in series, two ends of each winding unit is connected to the commutator segments, and the lead-out lines of the winding units that are connected to the commutator segments do not intersect each other, which can effectively avoid short-circuit of the winding units and ensure normal operation of the motor.

The invention claimed is:

1. A permanent magnet direct current motor comprising:
   a stator having 2P magnetic poles, where P is an integer greater than one; and
   a rotor rotatably mounted to the stator, the rotor comprising a rotary shaft, a rotary core fixed to the rotary shaft, a commutator, and a winding, the rotor core comprising m×P pole teeth, where m is an odd number greater than one, the commutator comprising k×m×P commutator segments, k being equal to 1 or 2, adjacent pole teeth defining therebetween winding slots for receiving the winding;
   wherein the winding comprises a plurality of winding units each having P coils directly connected in series, the P coils are respectively wound around P pole teeth having the same phase, each of two ends of each winding unit comprises a lead-out line, the lead-out line extends from the winding unit in the winding slot and is directly connected to a commutator segment of the commutator, any two lead-out lines extending out of different winding slots are spaced from each other at locations outside the commutator segments;
   wherein an end of the winding extends out from the last one of the winding units, spans adjacent pole teeth, and is connected from one of the winding slots to a corresponding commutator segment of the commutator or one commutator segment having the same potential as the commutator segment of the commutator, the end of the winding and the lead-out line extending from another winding unit as being from the adjacent pole tooth are spaced from each other and without intersecting to prevent short circuits between the end of the winding and the lead-out line extending the immediately adjacent commutator segment.

2. The permanent magnet direct current motor of claim 1, wherein the winding is wound by a continuous wire.

3. The permanent magnet direct current motor of claim 2, wherein the lead-out line of one of the winding units of the winding extends out from the last one of the winding units and is connected one corresponding commutator segment or another commutator segment having the same potential as the corresponding commutator segment after extending across one or two adjacent pole teeth, in such a manner that a wire terminal of the winding unit is spaced apart from ends of the lead-out lines of other winding units located close to the commutator segment.

4. The permanent magnet direct current motor of claim 1, wherein the winding comprises n layers, where n is an integer greater than zero but less than P, each layer comprises k×m winding units, each commutator segment of a part of the k×m×P commutator segments is connected to 2n winding units at the same time, each commutator segment of another part of the k×m×P commutator segments is connected to n winding units at the same time, and the remaining commutator segments of the k×m×P commutator segments are connected to none of the winding units.

5. The permanent magnet direct current motor of claim 4, wherein in the 2n winding units connected to one shared commutator segment, n winding units are wound in a clockwise direction, and the other n winding units are wound in a counter-clockwise direction.

6. The permanent magnet direct current motor of claim 4, wherein,
   k is equal to two, n is equal to one, and each pole tooth is wound with two coils that belong to two winding units, respectively; or
   k is equal to two, n is equal to two, and each pole tooth is wound with four coils that belong to four winding units, respectively.

7. The permanent magnet direct current motor of claim 1, wherein the rotor further comprises equalizing wires for connecting commutator segments having the same potential.

8. The permanent magnet direct current motor of claim 1, wherein the direct current motor further comprises a positive brush and a negative brush for being electrically connected with the commutator segments of the commutator; the k×m winding units of each layer of the winding form two parallel branches electrically connected with the positive brush and the negative brush.

9. The permanent magnet direct current motor of claim 1, wherein,
   P is equal to two, m is equal to three, and the direct current motor is a four-pole six-slot motor; or
   P is equal to three, m is equal to three, and the direct current motor is a six-pole nine-slot motor; or
   P is equal to four, m is equal to three, and the direct current motor is an eight-pole twelve-slot motor.

10. A cooling fan module comprising a fan and a permanent magnet direct current motor according to claim 1.

11. The cooling fan module of claim 10, wherein the winding is wound by a continuous wire.

12. The cooling fan module of claim 11, wherein the lead-out line of one of the winding units of the winding extends out from the last one of the winding units and is connected one corresponding commutator segment or another commutator segment having the same potential as the corresponding commutator segment after extending across one or two adjacent pole teeth, in such a manner that a wire terminal of the winding unit is spaced apart from ends of the lead-out lines of other winding units located close to the commutator segment.

13. The cooling fan module of claim 10, wherein the winding comprises n layers, where n is an integer greater than zero but less than P, each layer comprises k×m winding units, each commutator segment of a part of the k×m×P commutator segments is connected to 2n winding units at the same time, each commutator segment of another part of the k×m×P commutator segments is connected to n winding units at the same time, and the remaining commutator segments of the k×m×P commutator segments are connected to none of the winding units.

14. The cooling fan module of claim 13, wherein in the 2n winding units connected to one shared commutator segment, n winding units are wound in a clockwise direction, and the other n winding units are wound in a counter-clockwise direction.

15. The cooling fan module of claim 13, wherein,
   k is equal to two, n is equal to one, and each pole tooth is wound with two coils that belong to two winding units, respectively; or
   k is equal to two, n is equal to one, and each pole tooth is wound with four coils that belong to four winding units, respectively.

16. The cooling fan module of claim 10, wherein the rotor further comprises equalizing wires for connecting commutator segments having the same potential.

17. The cooling fan module of claim 10, wherein the direct current motor further comprises a positive brush and a negative brush for being electrically connected with the commutator segments of the commutator; the k×m winding units of each layer of the winding form two parallel branches electrically connected with the positive brush and the negative brush.

18. The cooling fan module of claim 10, wherein,
   P is equal to two, m is equal to three, and the direct current motor is a four-pole six-slot motor; or
   P is equal to three, m is equal to three, and the direct current motor is a six-pole nine-slot motor; or
   P is equal to four, m is equal to three, and the direct current motor is an eight-pole twelve-slot motor.

* * * * *